US011953320B2

(12) United States Patent
Nakamura

(10) Patent No.: US 11,953,320 B2
(45) Date of Patent: Apr. 9, 2024

(54) OPTICAL COHERENCE TOMOGRAPHIC IMAGER, OPTICAL COHERENCE TOMOGRAPHIC IMAGING METHOD, AND PROGRAM

(71) Applicant: NEC Corporation, Tokyo (JP)

(72) Inventor: Shigeru Nakamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 665 days.

(21) Appl. No.: 17/043,077

(22) PCT Filed: Mar. 28, 2019

(86) PCT No.: PCT/JP2019/013555
§ 371 (c)(1),
(2) Date: Sep. 29, 2020

(87) PCT Pub. No.: WO2019/189559
PCT Pub. Date: Oct. 3, 2019

(65) Prior Publication Data
US 2021/0018312 A1 Jan. 21, 2021

(30) Foreign Application Priority Data

Mar. 29, 2018 (JP) ................................. 2018-066025

(51) Int. Cl.
*G01B 9/02* (2022.01)
*G01B 9/02091* (2022.01)
(Continued)

(52) U.S. Cl.
CPC ......... *G01B 9/02091* (2013.01); *G02F 1/225* (2013.01); *G02F 1/212* (2021.01); *G02F 2201/30* (2013.01)

(58) Field of Classification Search
CPC ............ G01B 9/02004; G01B 9/02005; G01B 9/02069; G01B 9/02083; G01B 9/02091
See application file for complete search history.

(56) References Cited

U.S. PATENT DOCUMENTS 5,956,355 A * 9/1999 Swanson ............... H01S 3/0812
372/20
8,059,277 B2 11/2011 Atia et al.
(Continued)

FOREIGN PATENT DOCUMENTS

JP 2004-179465 A 6/2004
JP 2005-274507 A 10/2005
(Continued)

OTHER PUBLICATIONS

International Search Report dated Jun. 11, 2019, in corresponding PCT International Application.
(Continued)

*Primary Examiner* — Uzma Alam
*Assistant Examiner* — Jonathon Cook

(57) ABSTRACT

An optical coherence tomographic imager for contributing reduction of the number of man-hours for evaluation to obtain a wavelength sweeping operation of continuous, linear, and monotonic change while utilizing a wavelength-tunable laser having a structure that is less susceptible to mechanical disturbance. The optical coherence tomographic imager includes a wavelength-tunable light source, a branching means, an irradiation means, a photoelectric conversion measuring means, and a processor. The wavelength-tunable light source outputs light whose wavelength is determined by a plurality of light source drive parameters. The branching means branches output light of the wavelength-tunable light source into object light and reference light. The irradiation means irradiates an object to be measured with the object light. The photoelectric conversion measuring means obtains interference light intensity measurement values by causing object light scattered from the object to be measured and the reference light to interfere with each other and to be guided to a light receiver. The
(Continued)

processor reorders the interference light intensity measurement values based on the output light wavelengths.

12 Claims, 7 Drawing Sheets

(51) Int. Cl.
*G02F 1/225* (2006.01)
*G02F 1/21* (2006.01)

(56) References Cited

U.S. PATENT DOCUMENTS

| | | | |
|---|---|---|---|
| 9,337,619 B2 | 5/2016 | Atia et al. | |
| 9,595,804 B2 | 3/2017 | Minneman et al. | |
| 2008/0117430 A1* | 5/2008 | Terakawa | G01B 9/02004 |
| | | | 356/511 |
| 2009/0059970 A1 | 3/2009 | Atia et al. | |
| 2009/0059971 A1 | 3/2009 | Atia et al. | |
| 2009/0261240 A1* | 10/2009 | Watanabe | G01B 9/02072 |
| | | | 250/252.1 |
| 2012/0026505 A1 | 2/2012 | Atia et al. | |
| 2014/0307753 A1 | 10/2014 | Minneman et al. | |
| 2015/0109622 A1* | 4/2015 | Ota | G01N 21/4795 |
| | | | 356/479 |
| 2016/0282190 A1 | 9/2016 | Olszak | |

FOREIGN PATENT DOCUMENTS

| | | |
|---|---|---|
| JP | 2008-128710 | 6/2008 |
| JP | 2008-151734 A | 7/2008 |
| JP | 2011-021945 A | 2/2011 |
| JP | 2015-099078 A | 5/2015 |
| JP | 2016-149532 A | 8/2016 |
| JP | 2017-103498 A | 6/2017 |

OTHER PUBLICATIONS

Japanese Office Action for JP Application No. 2020-509311 dated Mar. 8, 2022 with English Translation.

* cited by examiner

OPTICAL COHERENCE TOMOGRAPHIC IMAGER, OPTICAL COHERENCE TOMOGRAPHIC IMAGING METHOD, AND PROGRAM

REFERENCE TO RELATED APPLICATION

The present invention is based upon and claims the benefit of the National Stage Entry of International Application No. PCT/PCT/JP2019/013555, filed Mar. 28, 2019, which claims priority from Japanese patent application No. 2018-066025, filed on Mar. 29, 2018, the disclosure of which is incorporated herein in its entirety by reference thereto.

The present invention relates to an optical coherence tomographic imager, an optical coherence tomographic imaging method, and a program. In particular, the present invention relates to an optical coherence tomographic imager, an optical coherence tomographic imaging method, and a program for irradiating an object to be measured with an optical beam and performing tomography on the scattered light from inside of the object by optical coherence tomography (OCT).

BACKGROUND

Field

The optical coherence tomography technique for performing tomographic observation of a region near a surface of an object to be measured which is irradiated with light by utilizing interference of light has been widely applied to medical diagnosis and industrial product inspection.

In OCT, an object to be measured is irradiated with light and a result which is obtained by causing scattered object light to interfere with the reference light is analyzed, thereby the position of the light scattering point in the optical axis direction, that is, in the depth direction is identified and thereby structural data spatially resolved in the depth direction is obtained.

In many cases, the object light is not 100% reflected only on a surface of the object to be measured but propagates to inside to some extent and is then backscattered. Therefore, it becomes possible to obtain structural data that is spatially resolved in the depth direction inside the object.

For OCT, there are a Time Domain (TD-OCT) scheme and a Fourier Domain (FD-OCT) scheme, but the FD-OCT scheme is more promising in terms of high speed and high sensitivity. In the FD-OCT scheme, when the object light and the reference light are interfered with each other, the interference light spectra in a wide wavelength band are measured, and the Fourier transform thereof is performed to obtain structural data in a depth direction. As a scheme of obtaining the interference light spectra, there are a Spectral Domain (SD-OCT) scheme using a spectroscope and a Swept Source (SS-OCT) scheme using a light source that sweeps the wavelength (see PATENT LITERATURE 3).

It becomes possible to obtain three-dimensional structure data by irradiating an object light beam to different positions of the object to be measured and obtaining spatially resolved structural data in an in-plane direction perpendicular to the optical axis while using the above method for obtaining spatially resolved structural data in the depth direction.

For irradiating the object light beam at different positions on the object to be measured, one object light beam is usually used with a galvanometer mirror or the like for scanning.

In a wavelength swept laser light source used for SS-OCT, the wavelength of the laser light is usually swept so as to be changed at high speed in a wide band range, continuously, and monotonically. The output light wavelength of the laser is defined depending on a cavity mode caused by a cavity length, the gain wavelength range of the gain medium in the cavity, and the transmission wavelength characteristics of wavelength selective components such as wavelength filters provided in the cavity in relation to each other, and there are several types of mechanisms used for wavelength sweeping.

There is a scheme in which a laser resonator is configured by a spatial optical system, a diffraction grating provided in the resonator is a Littrow arrangement or a Littman arrangement, and the output light wavelength is changed by altering the transmission wavelength of the diffraction grating. In this case, it is possible to continuously sweep the output light wavelength without causing discontinuous wavelength change called mode hop between the cavity modes (mode hop free). However, since it uses a spatial optical system, it is susceptible to mechanical disturbances.

In addition, PATENT LITERATURE 1 describes a scheme in which a Vertical Cavity Surface Emitting Laser (VCSEL) is combined with a wavelength filter of a micromachine (MEMS: Micro Electro-Mechanical System). Since it is a short cavity laser, it is possible to widen the wavelength spacing of cavity modes, and it is possible to perform mode-hop-free wavelength sweep operation. However, in addition to being susceptible to mechanical disturbance, it is difficult to increase the output light intensity because of a short cavity.

As a scheme that is less susceptible to mechanical disturbance, PATENT LITERATURE 2 describes a scheme that uses a laser structure monolithically integrated on a semiconductor optical waveguide. FIG. 7 shows a configuration diagram. A front mirror region 601, a gain region 602, a phase adjustment region 603, and a rear mirror region 604 are formed on the semiconductor optical waveguide. In the gain region 602, optical gain is generated by current injection. In the front mirror region 601 and the rear mirror region 604, light reflection is caused by a distributed Bragg reflector (DBR) structure, thereby a resonator structure is formed.

Light reflection spectra of the front mirror region 601 and the rear mirror region 604 have wavelength band ranges of a high light reflectance periodically at a certain wavelength interval, but the period of the front mirror region and the period of the rear mirror region are slightly different. By making current injection into both mirror regions be variable, it is possible to separately change the wavelength at which a high light reflectance is obtained. A laser oscillation wavelength is realized as a range where a wavelength at which a high reflectance is obtained in the front mirror region and a wavelength at which a high reflectance is obtained in the rear mirror region match.

By using the above configuration, the variable range of the laser oscillation wavelength can be widened. This is often called the Vernier effect. For obtaining laser oscillation, it is also necessary to adjust the optical phase when light reciprocates in both mirror regions, and this is adjusted by making current injection into the phase adjustment region 603 variable.

In SS-OCT, usually, the wavelength of the light source is changed from short wavelength to long wavelength or from long wavelength to short wavelength along time, the intensity of the interference light between the object light and the reference light is recorded with respect to time, and a corresponding relationship between the wavelength and the interference light intensity, that is, the interference light spectra are obtained. When sweeping wavelength of a light source, it is said to be desirable to reduce discontinuity and non-linearity as much as possible to be continuous, linear, and monotonically increasing or monotonically decreasing. This is because the interference light intensity recorded with respect to a change in time can be approximately regarded as interference light spectra.

In the wavelength swept light source as shown in FIG. 7, at least injection current amount to the front mirror region 601, an injection current amount to the rear mirror region 604, and an injection current amount to the phase adjustment region 603 are involved in the laser oscillation wavelength. Furthermore, in some cases, an injection current amount to the gain region 602 is also involved in it. A continuous, linear, and monotonically changing wavelength sweep operation is obtained by controlling these four light source drive parameters simultaneously.

PATENT LITERATURE 1: Japanese Patent Kokai Publication No. JP-P2016-149532A

PATENT LITERATURE 2: Japanese Patent Kokai Publication No. JP-P2017-103498A

PATENT LITERATURE 3: Japanese Patent Kokai Publication No. JP-P2015-099078A

SUMMARY

The disclosures of the above-mentioned prior art documents are incorporated herein in its entirety by reference thereto. The following analyses have been made by the present inventor.

In the wavelength swept laser light source described in PATENT LITERATURE 2, it is necessary to adjust the injection current amount at four places to change the wavelength. For example, as shown in FIG. 2 of PATENT LITERATURE 2, the dependence of the output light wavelength on two light source drive parameters of an injection current amount to the front mirror region 601 and an injection current amount to the rear mirror region 604 appears to be complicated. In fact, an injection current amount to the phase adjustment region 603 and an injection current amount to the gain region 602 also affect the output light wavelength. Therefore, for obtaining a wavelength sweeping operation of continuous, linear, and monotonic change, the number of man-hours for evaluation is significantly increased.

Further, in PATENT LITERATURE 3, it is presumed that the wavelength change of the wavelength swept light source in SS-OCT is a monotonic change. This is clear from FIG. 4 or FIG. 6 of the literature. However, in some cases, the wavelength change does not become a monotonic change unlikely as presumed in PATENT LITERATURE 3. Even in such a case, for obtaining a wavelength sweeping operation of continuous, linear, and monotonic change, the significant number of man-hours for evaluation is required.

It is a main object of the present invention to provide an optical coherence tomographic imager, an optical coherence tomographic imaging method, and a program for contributing reduction of the number of man-hours for evaluation to obtain a wavelength sweeping operation of continuous, linear, and monotonic change while utilizing a wavelength-tunable laser having a structure that is less susceptible to mechanical disturbance.

According to a first aspect of the present invention and disclosure, there is provided an optical coherence tomographic imager, including: a wavelength-tunable light source whose output light wavelength is determined by a plurality of light source drive parameters; a branching part that branches output light of the wavelength-tunable light source into object light and reference light; an irradiation part that irradiates an object to be measured with the object light; a photoelectric conversion measuring part that obtains interference light intensity measurement values by causing object light scattered from the object to be measured and the reference light to interfere with each other and to be guided to a light receiver; and a processor configured to reorder the interference light intensity measurement values based on the output light wavelengths.

According to a second aspect of the present invention and disclosure, there is provided an optical coherence tomographic imaging method, in an optical coherence tomographic imager, including: a wavelength-tunable light source whose output light wavelength is determined by a plurality of light source drive parameters; a branching part that branches output light of the wavelength-tunable light source into object light and reference light; an irradiation part that irradiates an object to be measured with the object light; and a photoelectric conversion measuring part that obtains interference light intensity measurement values by causing object light scattered from the object to be measured and the reference light to interfere with each other and to be guided to a light receiver, the method including: obtaining the interference light intensity measurement values; and reordering the interference light intensity measurement values based on the output light wavelengths.

According to a third aspect of the present invention and disclosure, there is provided a program, causing a computer which is mounted on an optical coherence tomographic imager including: a wavelength-tunable light source whose output light wavelength is determined by a plurality of light source drive parameters; a branching part that branches output light of the wavelength-tunable light source into object light and reference light; an irradiation part that irradiates an object to be measured with the object light; and a photoelectric conversion measuring part that obtains interference light intensity measurement values by causing object light scattered from the object to be measured and the reference light to interfere with each other and to be guided to a light receiver; to execute processing, including: obtaining the interference light intensity measurement values; and reordering the interference light intensity measurement values based on the output light wavelengths.

It is noted that this program can be recorded on a computer readable storage medium. The storage medium can be non-transient such as a semiconductor memory, a hard disk, a magnetic recording medium, an optical recording medium, and so on. The present invention can be realized as a computer program product.

According to each aspect of the present disclosure, there is provided an optical coherence tomographic imager, an optical coherence tomographic imaging method, and a program that contribute to reduction of the number of man-hours for evaluation to obtain a wavelength sweeping operation of continuous, linear, and monotonic change while utilizing a wavelength-tunable laser having a structure that is less susceptible to mechanical disturbance.

PREFERRED MODES

Figure 1:
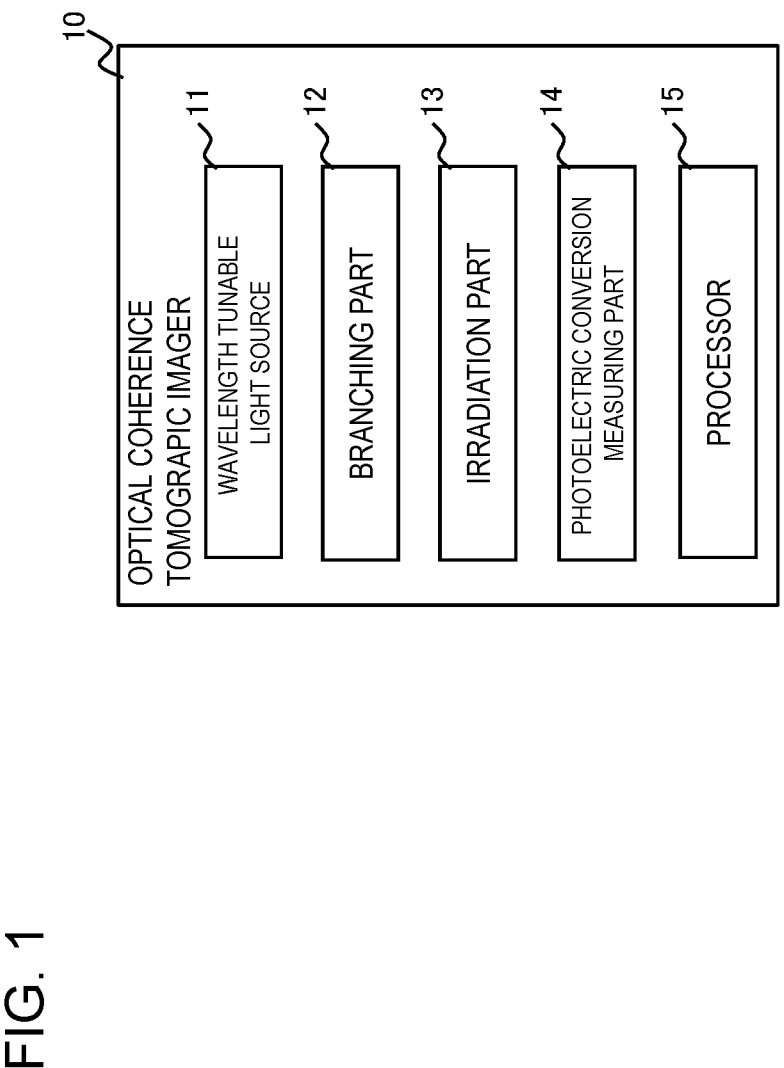
FIG. 1 illustrates an outline of an exemplary embodiment.

First, an outline of an exemplary embodiment will be described. In the following outline, reference signs of the drawings are denoted to each element as an example for the sake of convenience to facilitate understanding and the descriptions of the outline are not intended to limit the present invention. Further, connection lines between blocks in the drawings include both bidirectional and unidirectional. The one-way arrow schematically shows the flow of a main signal (data), and it does not exclude bidirectionality. Input ports and output ports are respectively provided at input terminals and output terminals for each connection line in a circuit diagrams, block diagrams, internal configuration diagrams and connection diagrams of the present disclosure, but they are not explicitly shown. The same applies to the input/output interfaces.

The optical coherence tomographic imager 10 according to one exemplary embodiment includes a wavelength-tunable light source 11, a branching part 12, an irradiation part 13, a photoelectric conversion measuring part 14, and a processor 15 (see FIG. 1). The wavelength-tunable light source 11 outputs light whose output light wavelength is determined by a plurality of light source drive parameters. The branching part 12 branches output light of the wavelength-tunable light source 11 into object light and reference light. The irradiation part 13 irradiates an object to be measured with the object light. The photoelectric conversion measuring part 14 obtains interference light intensity measurement values by causing object light scattered from the object to be measured and the reference light to interfere with each other and to be guided to a light receiver. The processor 15 reorders the interference light intensity measurement values based on the output light wavelengths.

The optical coherence tomographic imager 10 estimates or measures the output light wavelength emitted from the wavelength-tunable light source 11 and reorders the interference light intensity measurement values in ascending order or descending order of the output light wavelength. As a result, the interference light intensities are reordered continuously, and the number of man-hours for evaluation to obtain a wavelength sweeping operation of continuous, linear, and monotonic change is reduced.

Hereinafter, concrete exemplary embodiments will be described in more detail with reference to the drawings. In each of exemplary embodiments, the same elements are denoted by the same signs, and the description thereof will be omitted.

First Exemplary Embodiment

Figure 2:
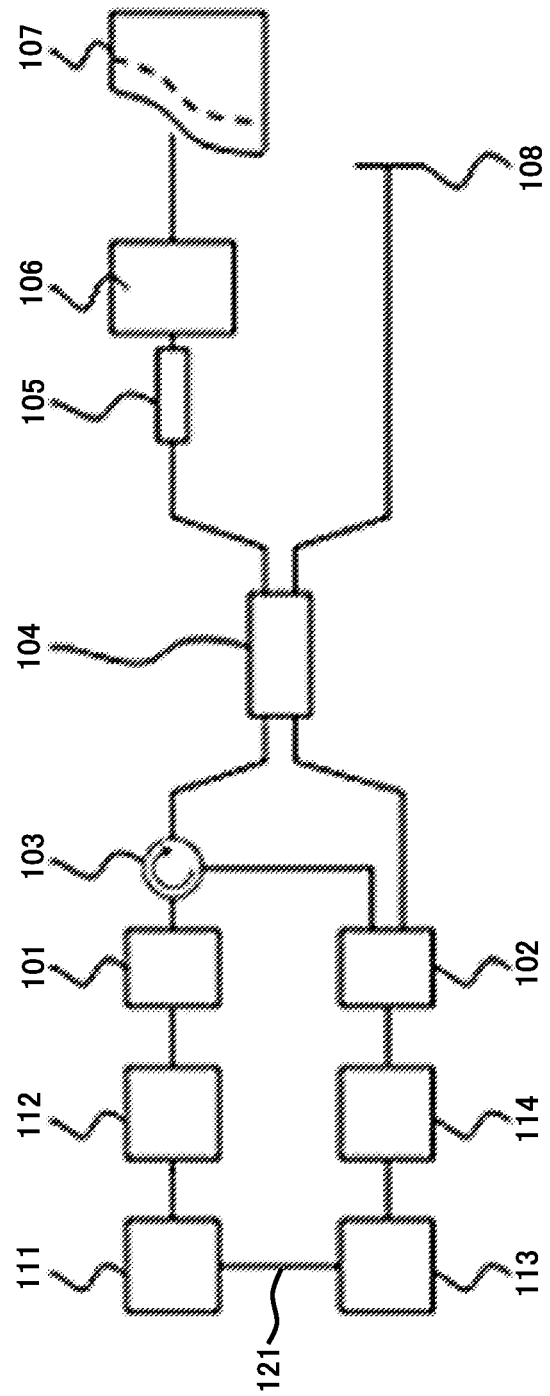
FIG. 2 illustrates an example of a configuration of an optical coherence tomographic imager according to a first exemplary embodiment.

A first exemplary embodiment will be described in detail with reference to the drawings. FIG. 2 illustrates an example of a configuration of an optical coherence tomographic imager 100 of the first exemplary embodiment.

The optical coherence tomographic imager 100 according to the first exemplary embodiment is an apparatus for taking a tomographic image by utilizing a wavelength-tunable laser having a structure such as a semiconductor monolithic integrated structure that is less susceptible to mechanical disturbances.

The wavelength-tunable light source 101 is a laser that emits light while changing wavelength, and its optical output wavelength is set by adjusting a plurality of light source drive parameters such as the injection current amount to a plurality of regions forming the laser. By changing the setting, output light in a range from wavelength 1510 nm to wavelength 1590 nm can be obtained. The output light from the wavelength-tunable light source 101 passes through a circulator 103 and is split into object light and reference light by a splitting/combining 104. The branching ratio of the object light and the reference light is preferably 1:1.

As the splitting/combining 104, one using fiber fusion, one using micro-optics, or the like can be used.

The object light passes through a fiber collimator 105 and an irradiation optical system 106 including a scan mirror and a lens, is irradiated onto an object to be measured 107, and backscattered light returns to the splitting/combining 104.

On the other hand, the reference light branched by the splitting/combining 104 returns to the splitting/combining 104 via the reference light mirror 108. In the splitting/combining 104, the object light scattered from the object to be measured and the reference light reflected by the mirror interfere with each other to obtain interference light.

One of the interference lights after passing through the splitting/combining 104 is input to a two-input balanced light receiver 102 via the circulator 103 and another is directly input to the two-input balanced light receiver 102.

The balanced light receiver 102 is a light receiver in which two photodiodes are connected in series and connection thereof is an output (differential output), and an existing one can be used. The bandwidth of the balanced light receiver 102 of this exemplary embodiment is less than or equal to 1 GHz.

Optical path lengths of the object light and optical path length of the reference light are set to be approximately equal after they are branched by the splitting/combining 104 until they are combined again. Since a frequency difference (wavelength difference) between the object light and the reference light occurs in case where the optical path lengths are different from each other, this frequency difference is made smaller than the photoelectric conversion bandwidth of the light receiver.

In the wavelength-tunable light source 101, output light wavelength is changed by changing a plurality of light source drive parameters, but the wavelength change is not always continuous along time, is not linear, and is not monotonic change. Rather, the output light wavelength by the wavelength-tunable light source 101 tolerates many discontinuities.

The light source drive parameters for the desired output light wavelength (for obtaining the desired output light wavelength) are tabulated and stored in a memory 111. That is, the memory 111 stores the corresponding relationship between the light source drive parameters and the light source output light wavelength setting values in the wavelength-tunable light source 101.

The memory 111 (more precisely, a memory controller built in the memory 111) sequentially sends the light source drive parameters to the current driver 112. The current driver 112 changes the wavelength of the output light of the wavelength-tunable light source 101 by injecting a current corresponding to the light source drive parameter into the wavelength-tunable light source 101. At the same time, the memory 111 sends the light source output light wavelength setting value(s) corresponding to the light source driving parameter(s) to the processor 113.

Figure 3A:
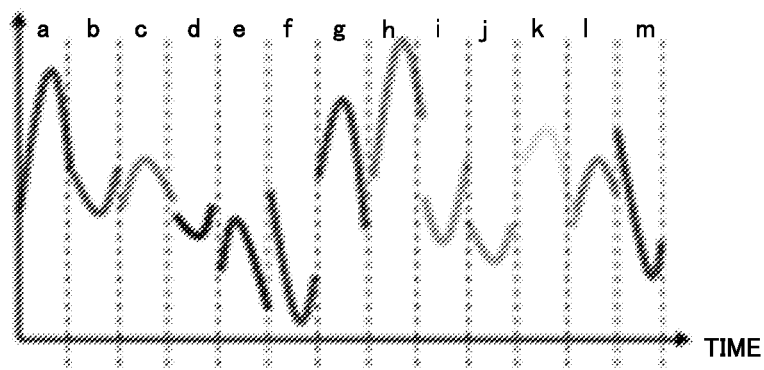
FIGS. 3A-3B illustrate an example of an interference light intensity.

Further, the photoelectric conversion output from the balanced light receiver 102 is digitized by an AD (Analog to Digital) converter 114 and sent to the processor 113 (the processor 113 obtains optical interference intensity). That is, the interference light intensity is recorded with respect to time. Here, the change of the wavelength with respect to time is not necessarily continuous, is not linear, and is not a monotonic change, and thus change of the interference light intensity with respect to time become like that as shown in FIG. 3A.

The processor 113 generates a corresponding relationship between the light source output light wavelength setting value(s) and the interference light intensity(ies) from a corresponding relationship between the light source output light wavelength setting value(s) and the time sent from the memory 111, and a corresponding relationship between the interference light intensity(ies) and the time sent from the balanced light receiver 102 through the AD converter 114. Further, the processor 113 reorders the acquired (measured) interference light intensity(ies) in ascending order or descending order of the wavelength setting value(s) to obtain wavelength spectra of the interference light intensity(ies).

Figure 3B:
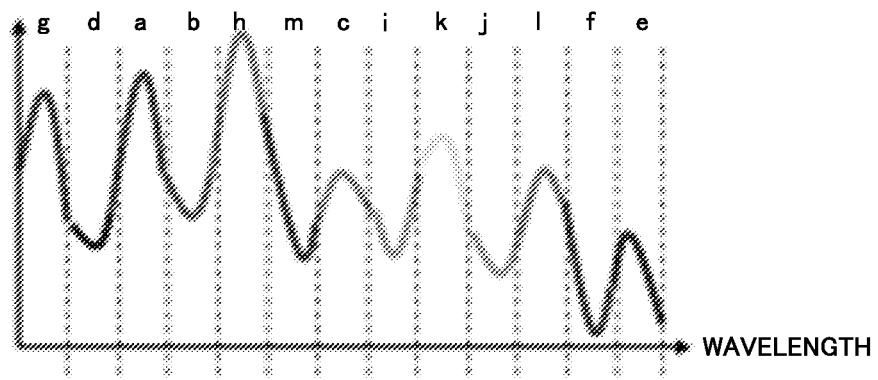

The wavelength spectra of the interference light intensity obtained by this is shown in FIG. 3B. By performing Fourier transform on the wavelength spectra of the interference light intensity(ies), the structural data in the depth direction of the object to be measured at the object light irradiation position can be obtained. The Fourier transform of the wavelength spectra is usually performed after preparing the interference light intensity data for equal optical frequency intervals. Note that the Fourier transform may be executed by the processor 113 or may be executed by other part (processing module).

As described above, the optical coherence tomographic imager 100 according to the first exemplary embodiment estimates the output light wavelength emitted from the wavelength-tunable light source 101 using the light source drive parameter(s), and generates the relationship between the output light wavelength(s) and the interference light intensity(ies). Further, the optical coherence tomographic imager 100 reorders the interference light intensities (measurement values of the interference light intensities) in ascending order or descending order of the output light wavelength based on the generated relationship. As a result, the interference light intensities are reordered in a continuous manner, and the number of man-hours for evaluation required to obtain a wavelength sweep operation of continuous, linear, and monotonic change is reduced.

Second Exemplary Embodiment

Figure 4:
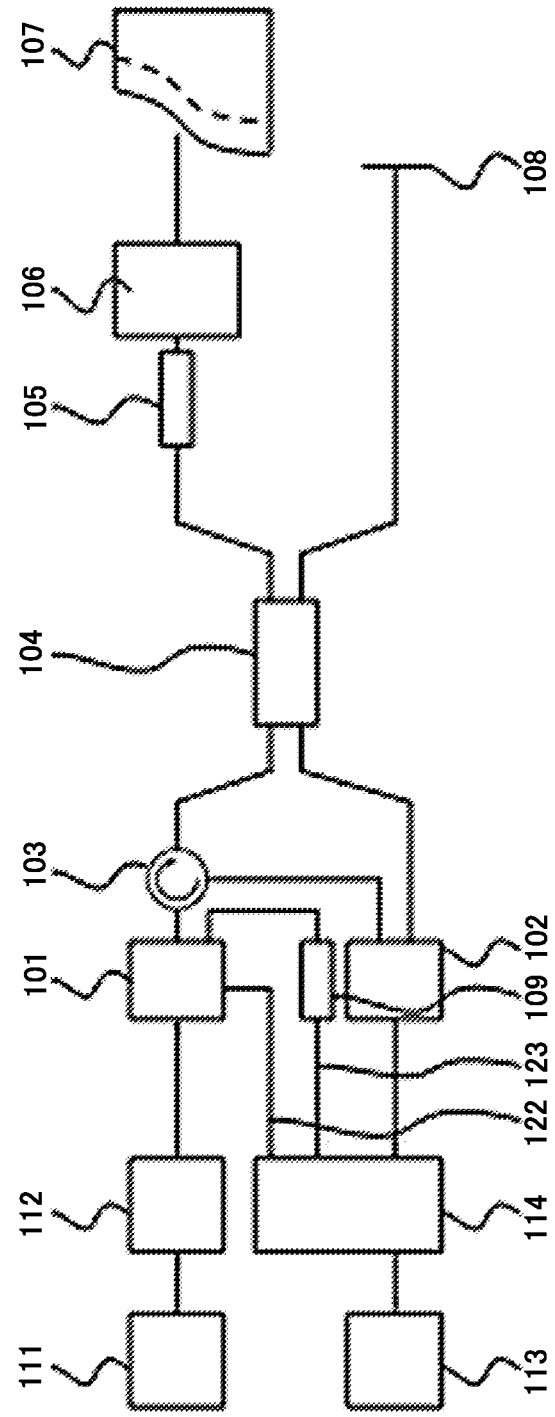
FIG. 4 illustrates an example of a configuration of an optical coherence tomographic imager according to a second exemplary embodiment.

Next, a second exemplary embodiment will be described in detail with reference to the drawings. FIG. 4 illustrates an example of a configuration of an optical coherence tomographic imager according to a second exemplary embodiment.

As is the case in the first exemplary embodiment, the output light from a wavelength-tunable light source 101 passes through a circulator 103 and is split into object light and reference light by a splitting/combining 104.

The object light passes through a fiber collimator 105 and an irradiation optical system 106 including a scan mirror and a lens, is irradiated onto an object to be measured 107, and backscattered light returns to the splitting/combining 104.

On the other hand, the reference light branched by the splitting/combining 104 returns to the splitting/combining 104 via the reference light mirror 108. In the splitting/combining 104, the object light scattered from the object to be measured and the reference light reflected by the mirror interfere with each other to result in interference light.

One of the interference lights after passing through the splitting/combining 104 is input to a two-input balanced light receiver 102 via the circulator 103 and another is directly input to the two-input balanced light receiver 102.

In the wavelength-tunable light source 101, output light wavelength is changed by changing a plurality of light source drive parameters, but the wavelength change is not always continuous along time, is not linear, and is not monotonic change. Rather, the output light wavelengths by the wavelength-tunable light source 101 tolerate many discontinuities.

The light source drive parameters for the desired output light wavelengths) are tabulated and stored in a memory 111. The memory 111 sequentially sends the light source drive parameters to the current driver 112. The current driver 112 changes the wavelength of the output light of the wavelength-tunable light source 101 by injecting a current corresponding to the light source drive parameter into the wavelength-tunable light source 101.

Further, the photoelectric conversion output from the balanced light receiver 102 is digitized by an AD converter 114 and sent to the processor 113. That is, the interference light intensity is recorded with respect to time.

In the second exemplary embodiment, a portion of the output light from the wavelength-tunable light source 101 is input to a wavelength monitor 109. The wavelength monitor 109 outputs a photoelectric conversion signal 123 having wavelength characteristics. The photoelectric conversion signal 123 is sent to the processor 113 through the AD converter 114. An electrical signal(s) 122 that monitors amounts of currents injected into a plurality of regions of the light source is also fed to the processor 113 through the AD converter 114.

The processor 113 generates a corresponding relationship between the light source output light wavelength measurement values and the interference light intensity(ies) from a corresponding relationship between the light source output light wavelength measurement value(s) and the time obtained by data sent from the wavelength monitor 109 through the AD converter 114, and a corresponding relationship between the interference light intensity and the time sent from the balanced light receiver 102 through the AD converter 114. Further, the processor 113 reorders the interference light intensity(ies) in ascending order or descending order of the wavelength measurement values to obtain the wavelength spectra of the interference light intensity.

By performing Fourier transform on the wavelength spectra of the interference light intensity, the structural data in the depth direction of the object to be measured at the object light irradiation position can be obtained.

Figure 5A:
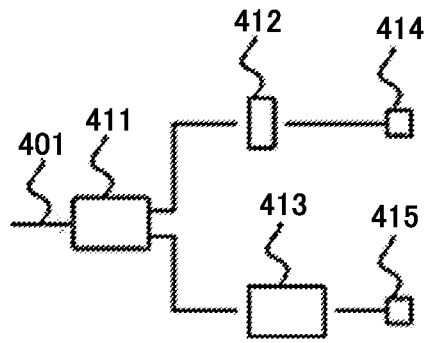
FIGS. 5A-5C illustrate an example of a configuration of a wavelength monitor according to the second exemplary embodiment.
Figure 5B:
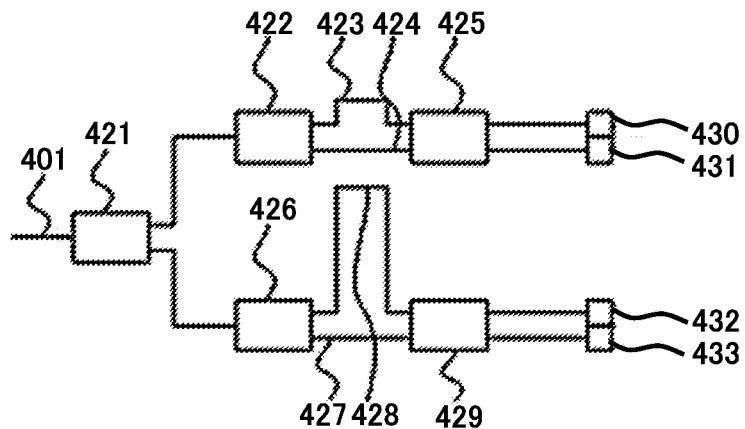
Figure 5C:
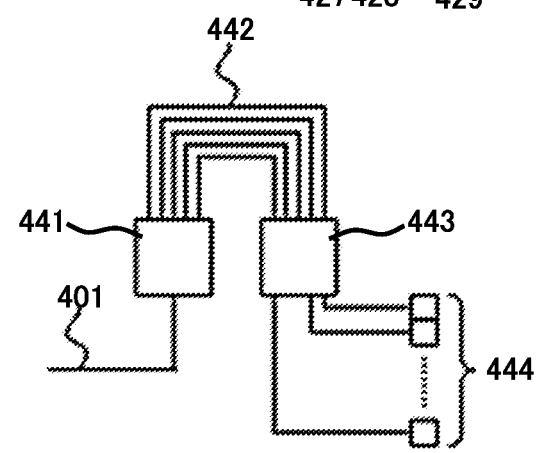

As the wavelength monitor 109, for example, the etalon as shown in FIG. 5A, the asymmetric Mach-Zehnder interferometer as shown in FIG. 5B and the arrayed [light] waveguide grating (AWG) as shown in FIG. 5C are used.

In the etalon as shown in FIG. 5A, a portion 401 of the output light from the light source is split by the splitter 411 and the split lights then pass through a short resonator length etalon 412 and a long resonator length etalon 413, respectively, then, are input to light receivers 414 and 415, respectively. The analog electric signals output from the light receivers 414 and 415 forms an output signal (photoelectric conversion signal 123) of the wavelength monitor 109. The etalon exhibits a light transmittance that periodically changes with respect to wavelength, but a period of the change becomes long for the etalon with a short resonator length, and a period of the change becomes short for the etalon with a long resonator length. By using such a wavelength characteristic, it becomes possible to identify a wavelength in a wide range such as, for example, a wavelength of from 1510 nm to 1590 nm.

In the asymmetric Mach-Zehnder interferometer as shown in FIG. 5B, a portion 401 of the output light from the light source is split by the splitter 421. One of the split output lights passes through an asymmetric Mach-Zehnder interferometer (interferometer including the splitters 422 and 425) in which a difference in lengths of optical paths 423 and 424 between both arms is small, and enters the light receivers 430 and 413, respectively. Further, another split output light passes through an asymmetric Mach-Zehnder interferometer (interferometer including the splitters 426 and 429) in which a difference in lengths of the optical paths 427 and 428 between both arms is long, and enter the light receivers 432 and 433, respectively. The analog electric signal outputs from the light receivers 430 to 433 configure an output signal (photoelectric conversion signal 123) of the wavelength monitor 109. The asymmetric Mach-Zehnder interferometer exhibits a light transmittance that periodically changes with respect to wavelength, but a period of the change becomes long for the asymmetric Mach-Zehnder interferometer whose optical path length difference between both arms is short and a period of the change becomes short for the asymmetric Mach-Zehnder interferometer whose optical path length difference between both arms is long. By using such wavelength characteristics, it becomes possible to identify a wavelength in a wide range such as, for example, a wavelength of from 1510 nm to 1590 nm.

In an AWG as shown in FIG. 5C, there are one input optical waveguide and N output optical waveguides (N is a positive integer), and a portion 401 of an output light from the light source is guided to different output optical waveguide 442 depending on a wavelength through a splitter 441. After that, the light(s) passes through the splitter 443 and is (are) input to any one of light receivers in a light receiver group 444. By using such wavelength characteristics, it becomes possible to identify a wavelength in a wide range such as, for example, a wavelength of from 1510 nm to 1590 nm.

As described above, the optical coherence tomographic imager 100 according to the second exemplary embodiment measures the output light wavelength emitted from the wavelength-tunable light source 101 and generates the relationship between the measured output light wavelength(s) and the interference light intensity(ies). Further, the optical coherence tomographic imager 100 reorders the interference light intensities (measurement values of the interference light intensities) in ascending order or descending order of the output light wavelengths based on the generated relationship. As a result, the interference light intensities are reordered in a continuous manner, and the number of man-hours for evaluation required to obtain a wavelength sweep operation of continuous, linear, and monotonic change is reduced.

Third Exemplary Embodiment

Figure 6:
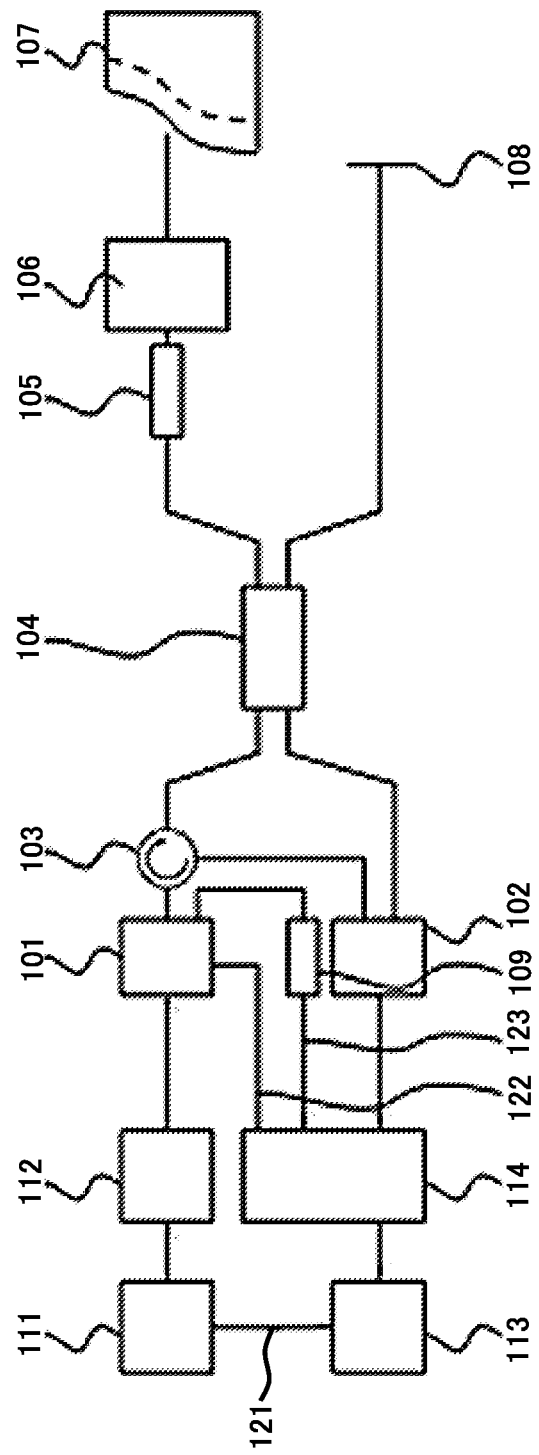
FIG. 6 illustrates an example of a configuration of an optical coherence tomographic imager according to a third exemplary embodiment.
Figure 7:
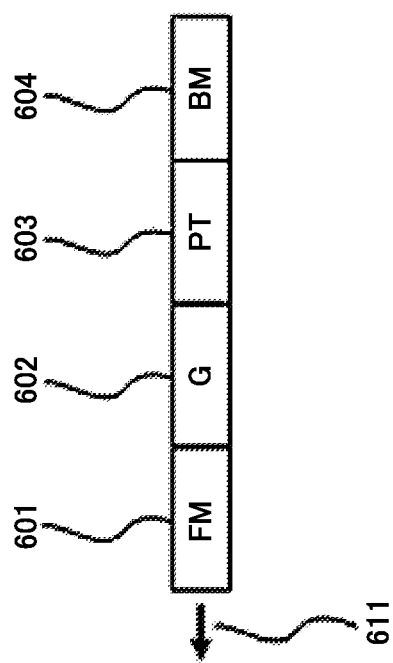
FIG. 7 illustrates an example of a configuration of a wavelength swept light source.

Next, a third exemplary embodiment will be described in detail with reference to the drawings. FIG. 6 illustrates an example of a configuration of an optical coherence tomographic imager 100 according to the third exemplary embodiment.

As is the case in the first exemplary embodiment, the output light from a wavelength-tunable light source 101 passes through a circulator 103 and is split into object light and reference light by a splitting/combining 104.

The object light passes through a fiber collimator 105 and an irradiation optical system 106 including a scan mirror and a lens, is irradiated onto an object to be measured 107, and backscattered light returns to the splitting/combining 104.

On the other hand, the reference light branched by the splitting/combining 104 returns to the splitting/combining 104 via the reference light mirror 108. In the splitting/combining 104, the object light scattered from the object to be measured and the reference light reflected by the mirror interfere with each other to form interference light.

One of the interference lights after passing through the splitting/combining 104 is input to a two-input balanced light receiver 102 via the circulator 103 and another is directly input to the two-input balanced light receiver 102.

In the wavelength-tunable light source 101, output light wavelength is changed by changing a plurality of light source drive parameters, but the wavelength change is not always continuous along time, is not linear, and is not monotonic change. Rather, the output light wavelength by the wavelength-tunable light source 101 tolerates many discontinuities.

The light source drive parameters for the desired output light wavelength are tabulated and stored in a memory 111. The memory 111 sequentially sends the light source drive parameters to the current driver 112. The current driver 112 changes the wavelength of the output light of the wavelength-tunable light source 101 by injecting a current corresponding to the light source drive parameter into the wavelength-tunable light source 101. At the same time, the memory 111 sends the light source output light wavelength setting value corresponding to the light source driving parameter to the processor 113.

Further, the photoelectric conversion-output from the balanced light receiver 102 is digitized by an AD converter 114 and sent to the processor 113. That is, the interference light intensity is recorded with respect to time.

In the third exemplary embodiment, a portion of the output light from the wavelength-tunable light source 101 is input to a wavelength monitor 109. The wavelength monitor 109 outputs a photoelectric conversion signal 123 having wavelength characteristics. The photoelectric conversion signal 123 is sent to the processor 113 through the AD converter 114. An electrical signal(s) 122 that monitor amounts of currents injected into a plurality of regions of the light source is also fed to the processor 113 through the AD converter 114.

The processor 113, first, derives again a relationship between time and a light source output light wavelength from a corresponding relationship between the light source output light wavelength setting value and the time sent from the memory 111, and a corresponding relationship between the light source output light wavelength measurement value and the time obtained from the data sent from the wavelength monitor 109 through the AD converter 114. As a procedure for deriving the relationship, for example, the light source output light wavelength setting value sent from the memory 111 at a certain time is compared with the light source output light wavelength measurement value obtained from the wavelength monitor 109, and only when they match, it can be considered to be judged that there is a correspondence between the time and the light source output light wavelength.

The processor 113 generates a corresponding relationship between the light source output light wavelength setting value and the interference light intensity from the above result and the corresponding relationship between the interference light intensity and the time sent from the balanced light receiver 102 through the AD converter 114. Further, the processor 113 reorders the obtained interference light intensity(ies) in ascending order or descending order of the wavelength setting value(s) to obtain the wavelength spectra of the interference light intensity(ies). By performing Fourier transform on the wavelength spectra of the interference light intensity(ies), the structural data in the depth direction of the object to be measured at the object light irradiation position can be obtained.

As the wavelength monitor 109, as is the case in the second exemplary embodiments, for example, the etalon as shown in FIG. 5A, the asymmetric Mach-Zehnder interferometer as shown in FIG. 5B and the arrayed waveguide grating (AWG) as shown in FIG. 5C are used.

As described above, the optical coherence tomographic imager 100 according to the third exemplary embodiment, identifies the wavelength of the output light being output by the wavelength-tunable light source 101 from the light source output light wavelength setting value by the light source drive parameters and the light source output light wavelength measurement value by the wavelength monitor 109. Further, the optical coherence tomographic imager 100 generates the corresponding relationship between the identified light source output light wavelengths and the interference light intensity measurement values and reorders the identified light source output wavelengths. As a result, as is the cases in the first and second exemplary embodiments, the number of man-hours for evaluation to obtain a wavelength sweeping operation of continuous, linear, and monotonic change is reduced and more accurate corresponding relationship between the light source output light wavelength setting value and the interference light intensity can be obtained.

The whole or part of the exemplary embodiments disclosed above can be described as, but not limited to, the following notes.

[Mode 1]

An optical coherence tomographic imager, comprising:
  a wavelength-tunable light source (101) whose output light wavelength is determined by a plurality of light source drive parameters;
  a branching part (104) that branches output light of the wavelength-tunable light source into object light and reference light;
  an irradiation part (106) that irradiates an object to be measured with the object light;
  a photoelectric conversion measuring part (114) that obtains interference light intensity measurement values by causing object light scattered from the object to be measured and the reference light to interfere with each other and to be guided to a light receiver; and
  a processor (113) configured to reorder the interference light intensity measurement values based on the output light wavelengths.

[Mode 2]

The optical coherence tomographic imager preferably according to mode 1,
  wherein the processor (113) reorders the interference light intensity measurement values in ascending order or descending order of the output light wavelength.

[Mode 3]

The optical coherence tomographic imager preferably according to mode 1 or 2, further comprising:
  a memory (111) that stores a corresponding relationship between light source drive parameters and optical source output light wavelength setting values for the wavelength-tunable light source (101);
  wherein the processor (113) generates a corresponding relationship between the optical source output light wavelength setting values and the interference light intensity measurement values from the optical source output light wavelength setting values and the interference light intensity measurement values, and reorders the interference light intensity measurement values by reordering the optical source output light wavelength setting values.

[Mode 4]

The optical coherence tomographic imager preferably according to mode 1 or 2, further comprising:
  a wavelength monitor part (109) that obtains an optical source output light wavelength measurement value using a portion of an output of the wavelength-tunable light source (101);
  wherein the processor (113) generates a corresponding relationship between the optical source output light wavelength measurement values and the interference light intensity measurement values from the optical source output light wavelength measurement values and the interference light intensity measurement values and reorders the interference light intensity measurement values by reordering the optical source output light wavelength measurement values.

[Mode 5]

The optical coherence tomographic imager preferably according to mode 1 or 2, further comprising:
  a memory (111) that stores a corresponding relationship between light source drive parameters and optical source output light wavelength setting values for the wavelength-tunable light source (101); and
  a wavelength monitor part (109) that obtains an optical source output light wavelength measurement value using a portion of an output of the wavelength-tunable light source (101);
  wherein the processor (113) is configured to identify the optical source output light wavelength being output by the wavelength-tunable light source from the optical source output light wavelength setting values and the optical source output light wavelength measurement values, generates a corresponding relationship between the identified optical source output light wavelength and the interference light intensity measurement values and reorders the interference light intensity measurement values by reordering the identified optical source output light wavelength.

[Mode 6]

The optical coherence tomographic imager according to preferably mode 4 or 5,
  wherein the wavelength monitor part (109) is at least one of an etalon, an asymmetric Mach-Zehnder interferometer, and an arrayed waveguide grating.

[Mode 7]
The optical coherence tomographic imager preferably according to any one of modes 1 to 6,
wherein the processor (113) applies Fourie Transformation on wavelength spectra of the reordered interference light intensity measurement values.

[Mode 8]
The optical coherence tomographic imager preferably according to any one of modes 1 to 7,
wherein a branching ratio of the object light and the reference light by the branching part (104) is 1:1.

[Mode 9]
An optical coherence tomographic imaging method, in an optical coherence tomographic imager (100), comprising:
a wavelength-tunable light source (101) whose output light wavelength is determined by a plurality of light source drive parameters;
a branching part (104) that branches output light of the wavelength-tunable light source into object light and reference light;
an irradiation part (106) that irradiates an object to be measured with the object light; and
a photoelectric conversion measuring part (114) that obtains interference light intensity measurement values by causing object light scattered from the object to be measured and the reference light to interfere with each other and to be guided to a light receiver, the method comprising:
obtaining the interference light intensity measurement values; and reordering the interference light intensity measurement values based on the output light wavelengths.

[Mode 10]
A program, causing a computer (113) which is mounted on an optical coherence tomographic imager comprising:
a wavelength-tunable light source (101) whose output light wavelength is determined by a plurality of light source drive parameters;
a branching part (104) that branches output light of the wavelength-tunable light source into object light and reference light;
an irradiation part (106) that irradiates an object to be measured with the object light; and
a photoelectric conversion measuring part (114) that obtains interference light intensity measurement values by causing object light scattered from the object to be measured and the reference light to interfere with each other and to be guided to a light receiver;
to execute processing, comprising:
obtaining the interference light intensity measurement values; and reordering the interference light intensity measurement values based on the output light wavelengths.

The ninth and tenth modes can be expanded to the second to eighth modes as is the case with the first mode.

The disclosures of the above patent literatures are incorporated herein by reference. Modifications and adjustments of the exemplary embodiments or examples are possible within the framework of the entire disclosure (including the claims) of the present invention and based on the basic technical concept thereof. In addition, various combinations of various disclosed elements (including each element of each claim, each element of each exemplary embodiment or example, each element of each drawing, and the like) or selection (including partial deletion) are possible within the scope of the entire disclosure of the present invention. That is, the present invention of course includes various variations and modifications that could be made by those skilled in the art according to the entire disclosure including the claims and the technical concept. In particular, with respect to the numerical ranges described herein, any numerical values or small range(s) included in the ranges should be construed as being expressly described even if not otherwise specified.

REFERENCE SIGNS LIST 10, 100 optical coherence tomographic imager
11, 101 wavelength-tunable light source
12 branching part
13 irradiation part
14 photoelectric conversion measuring part
15, 113 processor
102 balanced light receiver
103 circulator
104 splitting/combining
105 fiber collimator
106 irradiation optical system including a scan mirror and a lens
107 object to be measured
108 reference light mirror
109 wavelength monitor
111 memory
112 current driver
114 AD converter

The invention claimed is:

1. An optical coherence tomographic imager, comprising:
a wavelength-tunable light source whose output light wavelength is determined by a plurality of light source drive parameters;
a splitter that branches output light of the wavelength-tunable light source into object light and reference light;
an irradiation optical system that irradiates an object to be measured with the object light;
a two-input balanced light receiver that obtains interference light intensity measurement values by causing object light scattered from the object to be measured and the reference light to interfere with each other and to be guided to a light receiver;
a processor; and
a memory in circuit communication with the processor;
wherein the processor is configured to execute program instructions stored in the memory to reorder the interference light intensity measurement values based on the output light wavelengths; and
wherein the memory stores a corresponding relationship between light source drive parameters and optical source output light wavelength setting values for the wavelength-tunable light source;
wherein the processor is configured to execute program instructions stored in the memory to
generate a first corresponding relationship between (W) the optical source output light wavelength setting values and (I) the interference light intensity measurement values from
a second corresponding relationship between (W) the optical source output light wavelength setting values and (T) a time at which they are sent from the memory, the second corresponding relationship being not a monotonic change, and
a third corresponding relationship between (T) a time and (I) the interference light intensity measurement values, and reorder the interference light intensity measurement values in an ascending order or a descending order of the optical source output light wavelength setting values.

2. The optical coherence tomographic imager according to claim 1,
wherein the processor applies Fourie Transformation on wavelength spectra of the reordered interference light intensity measurement values.

3. The optical coherence tomographic imager according to claim 1,
wherein a branching ratio of the object light and the reference light by the splitter is 1:1.

4. The optical coherence tomographic imager according to claim 1, wherein the measurement values are time waveforms of the interference light intensity which varies non-continuously, non-linearly or non-monotonically with respect to time.

5. An optical coherence tomographic imaging method, comprising:
providing an optical coherence tomographic imager that comprises:
a wavelength-tunable light source whose output light wavelength is determined by a plurality of light source drive parameters;
a splitter that branches output light of the wavelength-tunable light source into object light and reference light;
an irradiation optical system that irradiates an object to be measured with the object light;
a two-input balanced light receiver that obtains interference light intensity measurement values by causing object light scattered from the object to be measured and the reference light to interfere with each other and to be guided to a light receiver;
a processor configured to reorder the interference light intensity measurement values based on the output light wavelengths; and
a memory, in circuit communication with the processor, that stores a corresponding relationship between light source drive parameters and optical source output light wavelength setting values for the wavelength-tunable light source;
the method further comprising:
by the processor, performing:
obtaining the interference light intensity measurement values;
generating a first corresponding relationship between (W) the optical source output light wavelength setting values and (I) the interference light intensity measurement values from
a second corresponding relationship which is not a monotonic change between (W) the optical source output light wavelength setting values and (T) a time at which they are sent from the memory, the second corresponding relationship being not a monotonic change, and
a third corresponding relationship between (T) a time and II) the interference light intensity measurement values; and
reordering the interference light intensity measurement values in an ascending order or a descending order of the optical source output light wavelength setting values.

6. The method according to claim 5, wherein the measurement values are time waveforms of the interference light intensity which varies non-continuously, non-linearly or non-monotonically with respect to time.

7. The method according to claim 5, wherein the processor applies Fourier Transformation on wavelength spectra of the reordered interference light intensity measurement values.

8. The method according to claim 5, wherein a branching ratio of the object light and the reference light by the splitter is 1:1.

9. A computer-readable non-transitory recording medium that stores a program, the program causing a computer to execute processing, the computer being mounted on an optical coherence tomographic imager comprising:
a wavelength-tunable light source whose output light wavelength is determined by a plurality of light source drive parameters;
a splitter that branches output light of the wavelength-tunable light source into object light and reference light;
an irradiation optical system that irradiates an object to be measured with the object light;
a two-input balanced light receiver that obtains interference light intensity measurement values by causing object light scattered from the object to be measured and the reference light to interfere with each other and to be guided to a light receiver;
wherein the computer comprises:
at least a processor; and
a memory in circuit communication with the processor;
wherein the program causes the processor to reorder the interference light intensity measurement values based on the output light wavelengths; and
wherein the memory stores a corresponding relationship between light source drive parameters and optical source output light wavelength setting values for the wavelength-tunable light source; and
wherein the program causes the processor to:
obtain the interference light intensity measurement values;
generate
a first corresponding relationship between (W) the optical source output light wavelength setting values and (I) the interference light intensity measurement values from
a second corresponding relationship between (W) the optical source output light wavelength setting values and (T) a time at which they are sent from the memory, the second corresponding relationship being not a monotonic change, and
a third corresponding relationship between (T) a time and (I) the interference light intensity measurement values; and
reorder the interference light intensity measurement values in an ascending order or a descending order of the optical source output light wavelength setting values.

10. The medium according to claim 9, wherein the measurement values are time waveforms of the interference light intensity which varies non-continuously, non-linearly or non-monotonically with respect to time.

11. The medium according to claim 9, wherein the processor applies Fourier Transformation on wavelength spectra of the reordered interference light intensity measurement values.

12. The medium according to claim 9, wherein a branching ratio of the object light and the reference light by the splitter is 1:1.

\* \* \* \* \*